United States Patent [19]

Lundquist et al.

[11] Patent Number: 5,436,549
[45] Date of Patent: Jul. 25, 1995

[54] METHODS FOR EXTENDING THE CYCLE LIFE OF SOLID, SECONDARY ELECTROLYTIC CELLS

[75] Inventors: Joseph Lundquist, Gilroy; Benjamin Chaloner-Gill, Santa Clara, both of Calif.

[73] Assignee: Valence Technology, Inc., Henderson, Nev.

[21] Appl. No.: 49,199

[22] Filed: Apr. 19, 1993

[51] Int. Cl.6 .............. H01M 10/44; H01M 10/46; H02J 7/00
[52] U.S. Cl. ......................................... 320/13; 320/14
[58] Field of Search ........................... 320/13, 14

[56] References Cited

U.S. PATENT DOCUMENTS

| | | | |
|---|---|---|---|
| 4,680,241 | 7/1987 | Dyer | 429/49 |
| 4,717,634 | 1/1988 | Diafuku et al. | 429/213 |
| 4,804,594 | 2/1989 | Jow et al. | 429/194 |
| 4,830,939 | 5/1989 | Lee et al. | 429/192 |
| 4,925,751 | 5/1990 | Shackle et al. | 429/191 |
| 5,057,387 | 10/1991 | Masuda et al. | 429/194 |

*Primary Examiner*—Thomas M. Dougherty
*Assistant Examiner*—Nicholas Ponomarenko
*Attorney, Agent, or Firm*—Gerald Swiss

[57] ABSTRACT

Disclosed are methods for extending the cycle life of solid, secondary electrolytic cells employing a solid electrolyte having at least about 100 ppm water which methods involve an initial, substantially constant, high rate discharge of the fabricated, charged electrolytic cell.

9 Claims, 2 Drawing Sheets

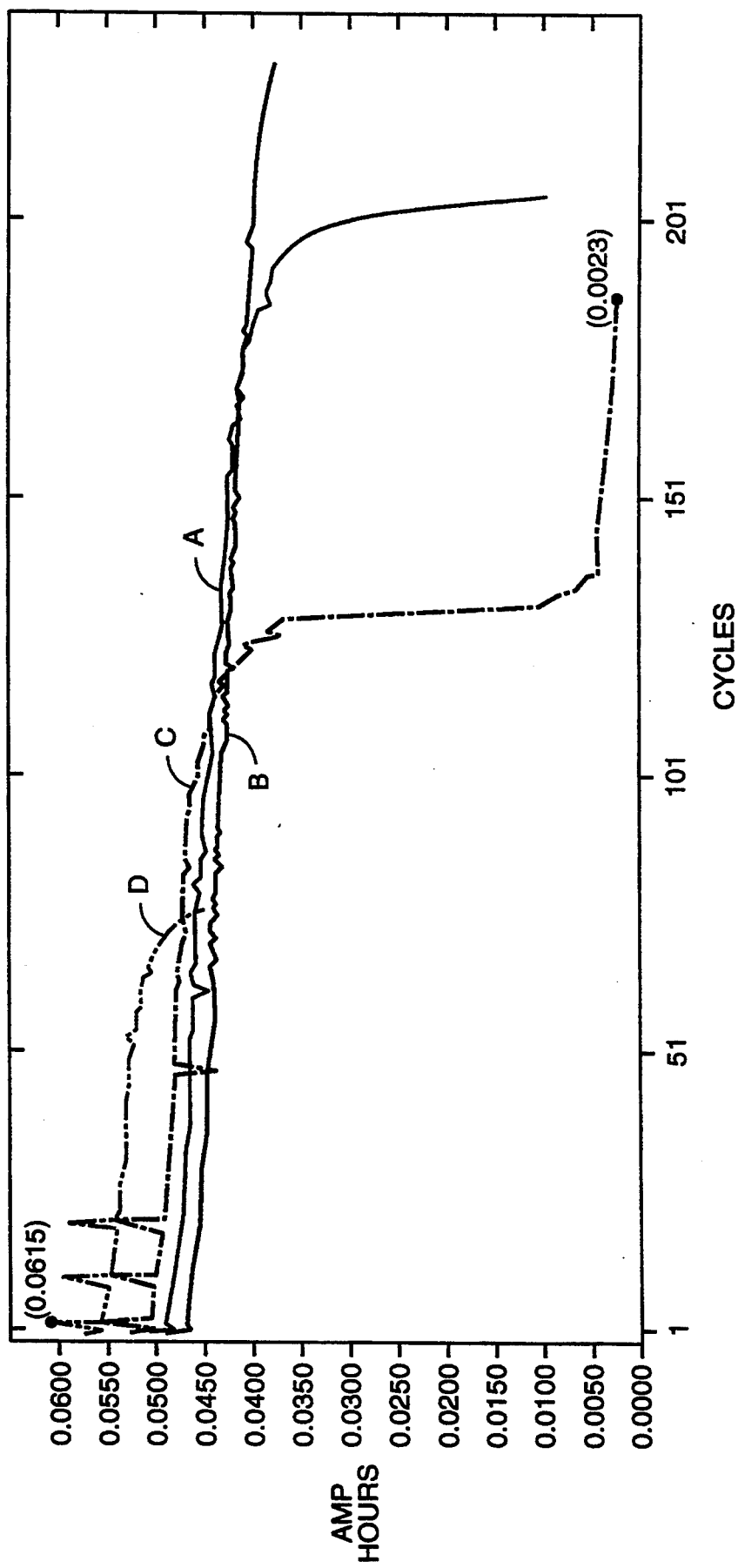
FIG._1

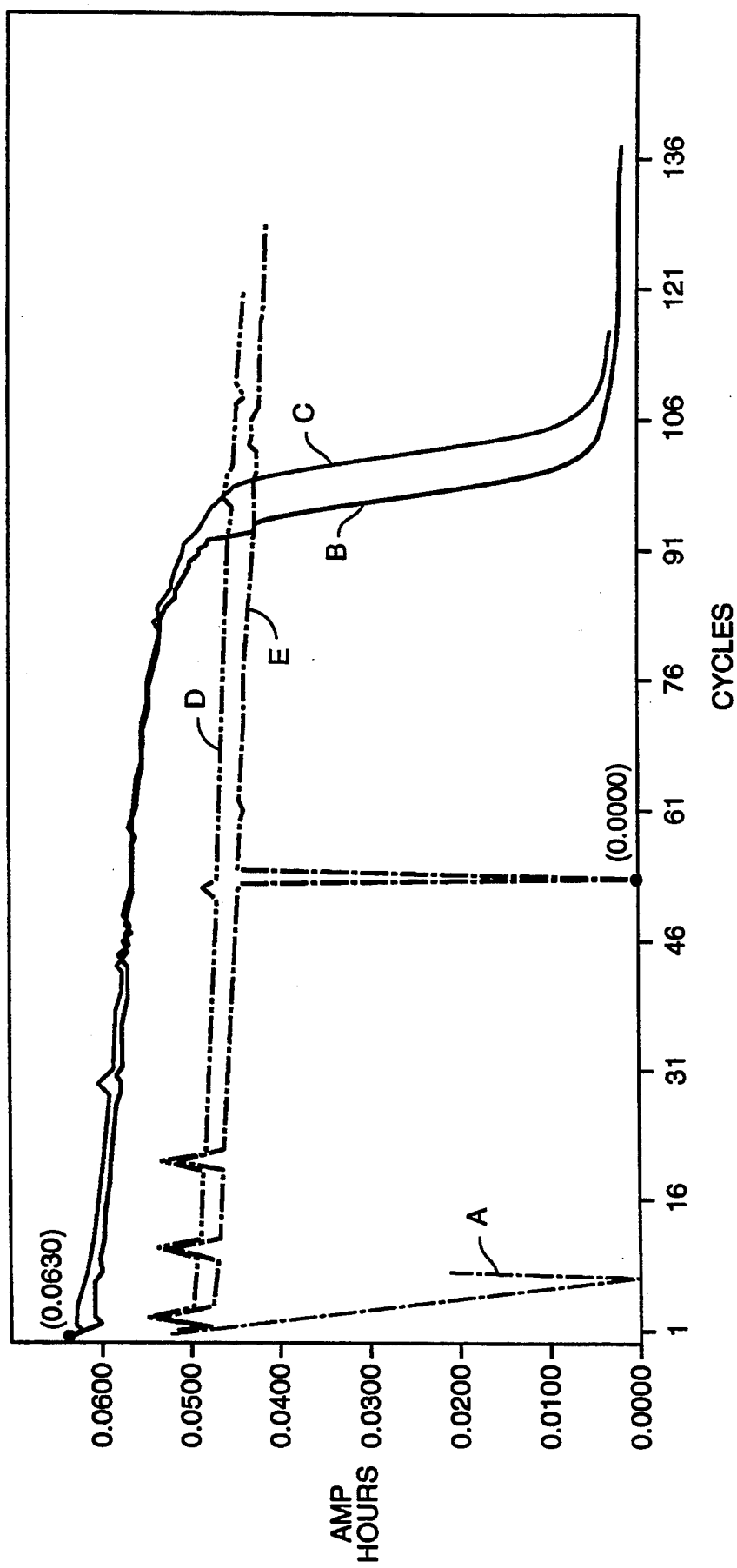
FIG._2

METHODS FOR EXTENDING THE CYCLE LIFE OF SOLID, SECONDARY ELECTROLYTIC CELLS

BACKGROUND OF THE INVENTION

1. Field of the Invention

This invention is directed to methods for extending the cycle life of solid, secondary electrolytic cells employing a solid electrolyte having at least about 100 ppm water and to the electrolytic cells produced by this method.

2. State of the Art

Electrolytic cells comprising an anode, a cathode and a solid, solvent-containing electrolyte are known in the art and are usually referred to as "solid electrolytic cells". One class of solid electrolytic cells are rechargeable (secondary) lithium cells which comprise a solid electrolyte interposed between an anode comprising lithium and a cathode which comprises materials suitable for recycling (recharging) the cell after discharge. The anode may be coated with a composition derived by reacting the lithium anode with from 1 to 50 weight percent water wherein the water can be initially placed into the cathode. See, for example, Masuda, et al., U.S. Pat. No. 5,057,387.

A solid, secondary battery typically comprises several solid, secondary electrolytic cells wherein the current from each of the cells is accumulated by a conventional current collector so that the total current generated by the battery is roughly the sum of the current generated from each of the individual electrolytic cells employed in the battery. Such an arrangement enhances the overall current produced by the solid, secondary battery to levels which render such batteries commercially viable.

However, one problem encountered with the use of solid, secondary electrolytic cells in such batteries is limited cycle life for the battery, i.e., the number of rechargings the battery can accept before the battery is no longer able to maintain acceptable levels of capacity. Specifically, the cycle life of the solid, secondary battery is related to the cycle lives of the individual electrolytic cells comprising the battery. In general, when one of the electrolytic cells in the battery ceases to maintain acceptable levels of capacity, the battery must drain more current from the remaining electrolytic cells so as to produce the same overall level of current from the battery which results in a reduction of the capacity of the remaining electrolytic cells in the battery. In turn, this results in a significant reduction in the cycle life of these cells and hence that of the battery.

Accordingly, in order to extend the cycle life of the battery at a given level of anodic material, it is necessary to extend the cycle lives of the individual electrolytic cells comprising the battery. It goes without saying that methods for increasing the cycle life of solid, secondary electrolytic cells would greatly facilitate their widespread commercial use.

SUMMARY OF THE INVENTION

After fabrication, electrolytic cells containing anodes comprising lithium are typically in a charged state and discharge of these cells is conventionally conducted, among other reasons, to improve their shelf life. The present invention is directed, in part, to the discovery that, in fabricated, charged electrolytic cells comprising lithium anodes and containing an electrolyte comprising at least 100 ppm water, a preconditioning step involving an initial high rate discharge of the cell unexpectedly extends the cycle life of the cell as compared to other preconditioning steps including a "spiked" discharge of the cell.

Specifically, this invention is directed to the unexpected discovery that an initial high rate discharge advantageously extends the cycle life of the fabricated electrolytic cell as compared to an initial spiked discharge when the water content of the electrolyte employed in the electrolytic cell is at least about 100 ppm. Contrarily, this initial high rate discharge adversely affects cycle life as compared to an initial spiked discharge when the water content of the electrolyte employed in the electrolytic cell is less than about 100 ppm. See, for example, U.S. patent application Ser. No. 08/049,201, filed concurrently herewith as Attorney Docket No. 1267 and entitled "METHODS FOR EXTENDING THE CYCLE LIFE OF SOLID, SECONDARY ELECTROLYTIC CELLS USING A SPIKED DISCHARGE" which application is incorporated herein by reference in its entirety.

Accordingly, in one of its method aspects, the present invention is directed to a method for extending the cycle life of a charged electrolytic cell comprising a lithium anode, a cathode comprising recyclable cathodic material which provides for an electrolytic cell potential after fabrication of at least 2.0 volts when used in combination with the lithium anode, and a solid, single-phase, solvent-containing electrolyte which comprises a solid polymeric matrix, an alkali salt, an electrolytic solvent, and at least about 100 ppm water, wherein the electrolyte is interposed between the anode and the cathode, which method comprises:

(a) an initial discharge of the charged electrolytic cell at a substantially constant rate of at least 0.5 milliamp per square centimeter;

(b) maintaining said discharge rate until the potential of the electrolytic cell is reduced by at least 0.5 volts compared to the potential prior to discharge, with the proviso that the potential of the cell is not reduced to less than 1 volt.

Preferably, the discharge rate is maintained in step (b) until the potential of the electrolytic cell is reduced by at least 1 volt.

In one of its composition aspects, this invention is directed to an electrolytic cell comprising:

a lithium anode, a cathode comprising recyclable cathodic material which provides for an electrolytic cell potential after fabrication of at least 2 volts when used in combination with the lithium anode, and a solid, single-phase, solvent-containing electrolyte which comprises a solid polymeric matrix, an alkali salt, an electrolytic solvent, and at least about 100 ppm water, wherein the electrolyte is interposed between the anode and the cathode and further wherein, after fabrication, the charged electrolytic cell is subjected to an initial discharge at a substantially constant rate of at least 0.5 milliamp per square centimeter wherein said discharge is maintained until the potential of the electrolytic cell is reduced by at least 0.5 volts compared to the potential prior to discharge with the proviso that the potential of the electrolytic cell is not reduced to less than 1 volt.

In the methods and compositions of this invention, the initial high rate discharge is generally conducted within the first 10 charge/discharge cycles ("cycles") after fabrication of the electrolytic cell, although preferably within the first five cycles and more preferably within the first three cycles. In a particularly preferred embodiment, the initial high rate discharge of the cell is conducted as the first cycle after fabrication of the charged electrolytic cell.

In another embodiment, the high rate discharge can be repeated at intervals or at each cycle during the electrolytic cell cycling.

Preferably, the electrolytic cells of this invention have a water content of from about 500 to about 10,000 ppm, more preferably, from about 500 to about 5,000 ppm, and still more preferably, from about 500 to about 3,000 ppm.

In another preferred embodiment for the methods and compositions of this invention, the substantially constant discharge has a variability in discharge rate of no more than about ±5% and even more preferably, no more than about ±2%.

In still another preferred embodiment of the methods and compositions of this invention, the substantially constant discharge rate is at least about 0.75 milliamp per square centimeter ($cm^2$) and, still more preferably, at least about 1 milliamp per $cm^2$.

When the cathodic material is $V_6O_{13}$ and the anode is metallic lithium, the resulting electrolytic cell has a potential of about 3.6 volts. In this embodiment, discharge at the selected substantially constant discharge rate is preferably continued until the potential of the electrolytic cell is reduced to about 1 to 2.2 volts and even more preferably to about 1.8 volts.

BRIEF DESCRIPTIONS OF THE DRAWINGS

FIG. 1 illustrates the ability of four (4) similarly prepared electrolytic cells, each containing about 3000 ppm water in the electrolyte, to maintain a capacity of at least 0.0350 amp hour over repeated charge/discharge cycles. Each of these cells employed $V_6O_{13}$ as the cathodic material and, in this figure, electrolytic cells A and B were treated during each discharge cycle with a high rate discharge step at a substantially constant rate of about 1 milliamp per $cm^2$ until the cell potential reached about 1.8 volts. Contrarily, electrolytic cells C and D were treated with a spiked discharge step during the third, eleventh and twenty-first discharge cycles as described in the examples below.

FIG. 2 illustrates the ability of five (5) similarly prepared electrolytic cells, each containing less than about 100 ppm water in the electrolyte, to maintain a capacity of at least 0.0350 amp hour over repeated charge/discharge cycles. Each of these cells employed $V_6O_{13}$ as the cathodic material and, in this figure, electrolytic cells A, B and C were treated during each discharge cycle with a high rate discharge step at a substantially constant rate of about 1 milliamp per $cm^2$ until the cell potential reached about 1.8 volts. Contrarily, electrolytic cells D and E were treated with a spiked discharge cycle during the third, eleventh and twenty-first discharge cycles which consists of a twelve step process set forth in the examples.

DETAILED DESCRIPTION OF THE PREFERRED EMBODIMENTS

As noted above, this invention is directed to methods for extending the cycle life of solid, secondary electrolytic cells employing a lithium anode and a solid electrolyte having at least about 100 ppm water and to the electrolytic cells produced by this method. However, prior to discussing this invention is further detail, the following terms will first be defined.

Definitions

As used herein, the following terms have the following meanings.

The term "solid, secondary electrolytic cell" refers to a composite electrolytic cell comprising a lithium anode, a solid, solvent-containing electrolyte and a cathode comprising a cathodic material capable of repeated discharge/charge cycles so as to permit repeated reuse wherein the electrolyte is interposed between the anode and the cathode.

The solid, solvent-containing electrolyte comprises an electrolytic solvent, an alkali salt, and a solid polymeric matrix.

The term "electrolytic solvent" (or "electrolyte solvent") refers to the solvent (i.e., plasticizer) included in the composite electrode and the electrolyte for the purpose of solubilizing alkali salts during operation of the electrolytic cell and also to act as a plasticizer. The solvent can be any low volatile aprotic polar solvent. Preferably, these materials are characterized by a boiling point greater than about 85° C. In this regard, low volatility for the electrolytic solvent simplifies manufacture of the electrolyte and improves the shelf-life of the resulting battery.

If the solid matrix forming monomer or partial polymer thereof employed in either the solid solvent-containing electrolyte or the composite electrode (cathode or anode) is cured or further cured by radiation polymerization to form the solid matrix, then the solvent should be radiation inert at least up to the levels of radiation employed. If the solid matrix forming monomer or partial polymer thereof is cured or further cured by thermal polymerization, then the solvent should be thermally inert at least up to the temperatures of thermal polymerization. Additionally, the solvent should not scavenge free radicals.

Representative examples of suitable electrolytic solvents include, by way of example, propylene carbonate, ethylene carbonate, γ-butyrolactone, tetrahydrofuran, glyme (dimethoxyethane), diglyme, triglyme, tetraglyme, dimethylsulfoxide, dioxolane, sulfolane and the like, and mixtures thereof. A preferred solvent is a mixture of an organic carbonate and triglyme, with a 4:1 mixture of propylene carbonate:triglyme being particularly preferred, as disclosed in U.S. patent application Ser. No. 07/918,509 filed on Jul. 22, 1992 which application is incorporated herein by reference in its entirety.

The term "alkali salt" refers to those salts wherein the cation of the salt is an alkali selected from the group consisting of lithium, sodium, potassium, rubidium and cesium which salts are suitable for use in the solid, solvent-containing electrolyte and in the composite electrodes of an electrolytic cell. The particular alkali salt employed is not critical and examples of suitable alkali salts include, by way of example, $LiClO_4$, $LiI$, $LiSCN$, $LiBF_4$, $LiAsF_6$, $LiCF_3SO_3$, $LipF_6$, $NaI$, $NaSCN$, $KI$, $CsSCN$ and the like. The alkali is preferably selected from the group consisting of lithium, sodium, potassium, and cesium and most preferably is lithium.

The term "solid polymeric matrix" or "solid matrix" refers to an electrolyte and/or composite electrode compatible material formed by polymerizing an inorganic or organic monomer (or partial polymers thereof) and which, when used in combination with the other components of the electrolyte or the composite electrode, renders the electrolyte or composite electrode solid. The solid matrix may or may not be ion-conducting. Preferably, however, the solid matrix is capable of ionically conducting inorganic cations (e.g., alkali ions as defined above). When employed to form the electrolyte or the composite electrode, the solid matrix forming monomer is polymerized in the presence of the alkali salt and the electrolytic solvent to form solid matrices which are suitable for use as solid electrolytes or composite electrodes in electrolytic cells.

Suitable solid polymeric matrices are well known in the art and include solid matrices formed from inorganic polymers, organic polymers or a mixture of polymers with inorganic non-polymeric materials.

Preferably, the solid polymeric matrix is an organic matrix derived from a solid matrix forming monomer and from partial polymers of a solid matrix forming monomer.

Alternatively, the solid polymeric matrix can be used in combination with a non-polymeric inorganic matrix. See, for example, U.S. Pat. No. 4,990,413 which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference.

The term "a solid matrix forming monomer" refers to inorganic or organic materials which in monomeric form can be polymerized to form solid polymeric matrices. Suitable solid matrix forming monomers are well known in the art and the particular monomer employed is not critical.

Preferably, the solid matrix forming monomers contain hetero atom functionalities capable of forming donor acceptor bonds with the cations of the alkali salt so as to render the solid matrix ion-conducting (i.e., able to conduct the alkali cations). Ion-conducting hetero atom functionalities in solid polymeric matrices include, by way of example, ether groups, amine groups, and the like. On the other hand, non-conductive solid matrix forming monomers can also be used herein including, by way of example, monomers not containing hetero atoms and monomers containing non-conductive hetero atom functionalities such as carboxylic acid groups, sulfonic acid groups, and the like. The latter are non-conductive because they strongly bind the alkali cation.

Examples of suitable solid matrix forming monomers include, by way of example, ethyleneimine

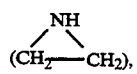

ethylene oxide

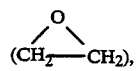

epichlorohydrine

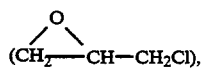

acryloyl-derivatized polyalkylene oxides (as disclosed in U.S. Pat. No. 4,908,283), urethane acrylate, vinyl sulfonate polyalkylene oxides (as disclosed in U.S. Pat. No. 5,262,253, 1992 and incorporated herein by reference), acrylic acid ($CH_2=CHCOOH$), chloroacrylic acid ($ClCH=CHCOOH$), bromoacrylic acid ($BrCH=CHCOOH$), crotonic acid ($CH_3CH=CHCOOH$), propylene ($CH_3CH=CH_2$), ethylene ($CH_2=CH_2$) and the like as well as mixtures thereof.

Examples of suitable inorganic solid matrix forming monomers include, by way of example, phosphazines and siloxanes. Phosphazine monomers and the resulting polyphosphazine solid matrix are disclosed by Abraham et al., Proc. Int. Power Sources Symp., 34th, pp. 81-83 (1990) and by Abraham et al., J. Electrochemical Society, Vol. 138, No. 4, pp. 921-927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized to form solid polymeric matrices.

The term "prepolymer" refers to solid matrix forming monomers and/or partial polymers thereof.

The term "cured" or "cured product" refers to the treatment of prepolymers under polymerization conditions so as to form a solid polymeric matrix. The resulting cured product can include cross-linking between polymer backbones.

Suitable polymerization conditions are well known in the art and include by way of example, heating the monomer, irradiating the monomer with UV light, electron beams, etc. Examples of cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the alkali salt and the electrolytic solvent. For example, a composition comprising requisite amounts of the solid matrix forming monomer, alkali salt and electrolytic solvent can be applied to a substrate and then cured. Alternatively, the solid matrix forming monomer can be first cured and then dissolved into a suitable volatile solvent. Requisite amounts of the alkali salt and electrolytic solvent can then be added. The mixture is then placed on a substrate and removal of the volatile solvent results in formation of a solid electrolyte. In either case, the resulting solid electrolyte is a homogeneous, single phase product which is maintained upon curing or evaporation, and does not readily separate upon cooling to temperatures below room temperature. Accordingly, the solid electrolyte of this invention does not include a separator as is typical of liquid electrolytes.

The term "lithium anode" refers to anodes comprising lithium, including, by way of example, metallic lithium, lithium alloys, such as alloys of lithium with aluminum, mercury, zinc, and the like, and intercalation based anodes containing lithium such as those based on carbon, tungsten oxides, and the like.

The cathode comprises a compatible cathodic material which refers to any material which functions as a positive pole (cathode) in a solid, secondary electrolytic cell and which is capable of being recharged (recycled) and which, when employed with the lithium anode, provides a fabricated electrolytic cell potential of at least about 2 volts. Such compatible cathodic materials are well known in the art and include, by way of example, manganese dioxide, molybdenum trioxide, vanadium oxides such as $V_6O_{13}$, $LiV_3O_8$, $V_2O_5$, and the like, sulfides of titanium, molybdenum and niobium, and the like, chromium oxide, copper oxide, $LiCoO_2$, $LiMnO_2$, etc. The particular compatible cathodic material employed is not critical.

The term "composite electrode" refers to cathodes and anodes wherein the cathode is comprised of materials other than compatible cathodic materials and the anode is comprised of materials other than compatible anodic materials. Typically, the composite contains a polymer which acts to bind the composite materials together. This polymer is derived from a solid matrix forming monomer or partial polymer thereof.

Composite cathodes are well known in the art. For example, a composite cathode can comprise a compatible cathodic material, a conductive material, an electrolytic solvent, an alkali salt, and a solid polymeric matrix which is derived from a solid matrix forming monomer or partial polymer thereof.

Composite anodes are also well known in the art. For example, a composite anode can comprise a compatible intercalation anodic material, an electrolytic solvent and a solid polymeric matrix which is derived from a solid matrix forming monomer or partial polymer thereof.

The term "cycle life" refers to the number of discharge/charge cycles which can be conducted on an electrolytic cell before that cell is no longer able to maintain a capacity in the charged state equal to at least 50% of its charged capacity after fabrication.

Methodology

The preconditioning step described herein involves a substantially constant, high rate discharge of a charged electrolytic cell wherein discharge is conducted within the first ten cycles after fabrication. This discharge is generally conducted at a rate of at least about 0.5 milliamp per $cm^2$ of surface area of the electrolytic cell, although preferably at a rate of at least about 0.75 milliamp per $cm^2$ and, still more preferably, at least about 1 milliamp per $cm^2$.

The substantially constant, high rate discharge preferably has a variability in the selected discharge rate of no more than about ±5% and, even more preferably, no more than about ±2%, during the course of the discharge. Accordingly, if the selected discharge rate is 1 milliamp per $cm^2$ then, at this rate, a substantially constant discharge rate will range from 0.95 to 1.05 milliamp per $cm^2$ and preferably from 0.98 to 1.02 milliamp per $cm^2$.

The electrolytic cell is fabricated to have an initial charged potential of at least about 2 volts and discharge is generally continued until the potential of the electrolytic cell is reduced by about 0.5 volts and preferably by about 1 volt, although, the cell is not permitted to discharge below a electrolytic cell potential of 1 volt. Additionally, discharge is conducted under conditions which do not significantly alter the rechargeability of the electrolytic cell.

The initial, substantially constant, high rate discharge of the electrolytic cell is generally conducted on the charged electrolytic cell within the first 10 charge/discharge cycles ("cycles") after fabrication, although preferably within the first five cycles and more preferably within the first three cycles. In a particularly preferred embodiment, the initial, substantially constant, high rate discharge of the cell is conducted as the first cycle after fabrication of the charged electrolytic cell.

In another embodiment, the high rate discharge can be repeated at intervals during the electrolytic cell cycling.

Discharge is generally conducted at from about 22° C. to 25° C. and is accomplished by conventional methods with the only constraints being that discharge is conducted at a substantially constant rate of at least about 0.5 milliamp per $cm^2$ and is continued until the potential of the electrolytic cell is reduced by about 0.5 volts, although, the cell is not permitted to discharge below an electrolytic cell potential of 1 volt. This means that prior to discharge, the charged electrolytic cell has a potential of at least 1.5 volts. This constraint is readily met if the initial high rate discharge is conducted on the first discharge cycle since, after fabrication, the electrolytic cell has an initial potential of at least 2 volts. If the initial high rate discharge cycle is conducted during one of the first ten cycles, then care should be taken to ensure that the charged cell potential prior to discharge is at least 1.5 volts.

After this initial, substantially constant, high rate discharge, the electrolytic cell is recharged by conventional methods and can then be used in a conventional manner. Recharge is preferably conducted at from about 0.1 to about 0.5 milliamp per $cm^2$ although preferably at about 0.25 milliamp per $cm^2$.

The electrolytic cells employed in the methods recited above can be prepared by fabricating a solid, solvent-containing electrolyte, a rechargeable cathode and an anode comprising lithium. The rechargeable cathode is selected so as to provide for a fabricated electrolytic cell having a potential of at least 2 volts.

Specifically, the cathode comprises a compatible cathodic material which functions as a positive pole (cathode) in a solid, secondary electrolytic cell and which is capable of being recharged (recycled) and which, when employed with the lithium anode, provides a fabricated electrolytic cell potential of at least about 2 volts. Preferably, the cathode is derived from a cathode paste comprising the compatible cathodic material and an electroconductive material including, by way of example, graphite, powdered carbon, powdered nickel, metal particles, conductive polymers (i.e., characterized by a conjugated network of double bonds like polypyrrole, polythiophene, polyaniline, and polyacetylene), and the like.

In a particularly preferred embodiment, the cathode is prepared from a cathode paste which comprises:
   from about 35 to 65 weight percent of a compatible cathodic material;
   from about 1 to 20 weight percent of an electroconductive material as described above;
   from about 0 to 20 weight percent of a polyalkylene oxide film forming agent comprising repeating units of

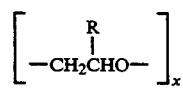

where R is hydrogen or alkyl of from 1 to 3 carbon atoms and x is an integer such that the number average molecular weight of the film forming agent is at least about 100,000 and preferably from about 100,000 to about 5,000,000 and even more preferably from about 500,000 to about 750,000;

from about 10 to 50 weight percent of electrolytic solvent; and from at least about 5 weight percent to about 30 weight percent of a prepolymer, wherein all weight percents are based on the total weight of the cathode.

The cathode paste is typically spread onto a suitable support such as a current collector and then cured by conventional methods to provide for a solid positive cathodic plate. The cathode (excluding the support) generally has a thickness of about 20 to about 150 microns.

Current collectors are well known in the art some of which are commercially available. A particularly preferred current collector for the cathode is a roughened nickel (electrolytically deposited nickel) on nickel current collector (available as CF18/NiT from Fukuda Metal Foil & Powder Company, Ltd., Kyoto, Japan). Another preferred current collector is aluminum foil to which an adhesive layer has been applied. Such adhesive layers are described in the examples below as well as in U.S. patent application Ser. No. 07/968,155, filed on Oct. 29, 1992 and which is incorporated herein by reference in its entirety.

The current collectors are preferably attached to the surface of the cathode not facing the electrolyte but can also be attached to the anode. When the current collector is attached to the cathode, the cathode is interposed between the electrolyte and the current collector.

The solid, solvent-containing electrolyte is preferably prepared by combining a prepolymer with the alkali salt and the electrolytic solvent to form an electrolyte solution. Optionally, a film forming agent such as a polyalkylene oxide film forming agent comprising repeating units of

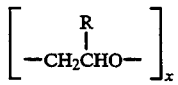

where R is hydrogen or alkyl of from 1 to 3 carbon atoms and x is an integer such that the number average molecular weight of the film forming agent is at least about 100,000 and preferably from about 100,000 to about 5,000,000 and even more preferably from about 500,000 to about 750,000, can be incorporated into the electrolyte solution.

In a preferred embodiment, the resulting electrolyte solution comprises:

from about 40 to 80 weight percent electrolytic solvent based on the weight of the electrolyte solution, preferably from about 60 to 80 weight percent, and even more preferably from about 60 to 70 weight percent;

from about 5 to 30 weight percent of prepolymer based on the weight of the electrolyte solution, preferably from about 10 to 25 weight percent, and even more preferably from about 17 to 22 weight percent; and from about 5 to about 25 weight percent of the alkali salt based on the weight of the electrolyte solution, preferably from about 7 to 15 weight percent, and even more preferably from about 8 to 13 weight percent.

When a polyalkylene oxide film forming agent is employed, it is preferably employed at from about 1 to 10 weight percent based on the weight of the electrolyte solution, more preferably from about 1 to 5 weight percent, and still more preferably from about 2.5 to 3.5 weight percent.

Also, when the electrolyte solution employs a polyalkylene oxide film forming agent, it is preferably mixed in the manner described hereinbelow in Example 2.

The resulting solution is preferably uniformly coated onto the cathode prepared as described above by means of a roller, a doctor blade, a bar coater, a silk screen or spinner to obtain a film of this solution over the cathode. However, other substrates can be used such as aluminum foil, glass plates, the lithium anode, etc.

In order to enhance its application of the electrolyte solution onto the cathode or other substrate, this solution is preferably a liquid and even more preferably has a viscosity of from about 500 to about 10,000 centipoise at 25° C. and still more preferably has a viscosity of from about 1000 to about 4000 centipoise at 25° C. In some cases, it may be necessary to heat the solution so as to reduce the viscosity of the solution thereby providing for a coatable material.

Preferably, the amount of electrolyte solution coated onto the substrate is an amount sufficient so that after curing, the resulting solid, solvent-containing electrolyte has a thickness of no more than about 250 microns ($\mu$m). Preferably, the solid, solvent-containing electrolyte has a thickness of from about 25 to about 250 microns, more preferably from about 50 to about 150 microns, and even more preferably from about 50 to about 80 microns.

The composition is cured by conventional methods to form a solid, solvent-containing electrolyte. For example, when the prepolymer contains a reactive double bond, suitable curing methods include heating, irradiation with UV radiation, irradiation with electron beams (EB), etc. When the composition is cured by heating or UV radiation, the composition preferably contains an initiator. For example, when curing is by heating, the initiator is typically a peroxide such as benzoyl peroxide, methyl ethyl ketone peroxide, t-butyl peroxypyvarate, diisopropyl peroxycarbonate, and the like). When curing is by UV radiation, the initiator is typically benzophenone, Darocur 1173 (Ciba Geigy, Ardsley, N.Y.), and the like.

The initiator is generally employed in an amount sufficient to catalyze the polymerization reaction. Preferably, the initiator is employed at up to about 1 weight percent based on the weight of the solid matrix forming monomer.

When curing is by EB treatment, an initiator is not required.

In an alternative embodiment, the solid polymeric matrix (e.g., formed by polymerization of a prepolymer) can be dissolved into a suitable volatile solvent and the requisite amounts of the alkali salt and electrolytic solvent are then added. The mixture is then applied onto a suitable substrate (e.g., the surface of the cathode opposite to the current collector) in the manner set forth above and the volatile solvent removed by conventional techniques (e.g., evaporation) to provide for a solid, single phase, electrolyte. Suitable volatile solvents preferably have a boiling point of less than 85° C. and more preferably from about 45° to less than 85° C. Particularly preferred volatile solvents are aprotic solvents. Examples of suitable volatile solvents include acetonitrile, tetrahydrofuran, and the like. However, acetonitrile is not preferred if it is to contact the anode.

In another alternative embodiment, the liquid electrolyte composition containing such prepolymers can be applied over a layer of cathode paste which itself is formed over a layer of electrically-conducting adhesion-promoter found on a metal foil. Both the cathode paste and the liquid electrolyte composition are simultaneously cured by exposure to, for example, electron beams so as to provide for a cured composite containing both the cured cathode and the cured electrolyte. The formed electrolyte is preferably covered with Mylar or other inert film during storage.

Additionally, the resulting solid electrolyte is prepared to contain at least 100 ppm water by adding, when necessary, the requisite amount of water into the electrolyte solution and then forming the cured product.

In any event, the resulting electrolyte is a homogeneous, single phase material which is maintained upon curing, and does not readily separate upon cooling to temperatures below room temperature. See, for example, U.S. Pat. No. 4,925,751 which is incorporated herein by reference in its entirety.

In a preferred embodiment, the lithium anode is then laminated onto the electrolyte so as to fabricate an electrolytic cell having an anode, a cathode and interposed therebetween, a solid, solvent-containing electrolyte.

Methods for preparing solid electrolytes and electrolytic cells are also set forth in U.S. Pat. Nos. 4,830,939 and 4,925,751 which are incorporated herein by reference in their entirety.

Utility

The methods of this invention enhance the cycle life of solid, secondary electrolytic cells employing a solid, solvent-containing electrolyte initially containing at least about 100 ppm water. The examples set forth hereinbelow illustrate that substantial improvements in cycle life are achieved for such electrolytic cells by the initial high rate discharge described herein. Without being limited to any theory, it is believed that this initial high rate discharge in conjunction with the high levels of water initially present in the solid, solvent-containing electrolyte results in a purging from the anode surface of a significant amount of impurities and other components detrimental to the cycle life of the electrolytic cell. Again, without being limited to any theory, it is further believed that, in the absence of such high levels of water initially present in the electrolyte, the initial high rate discharge described herein is insufficient to remove such a significant level of impurities and other components detrimental to cycle life from the anode surface. Under these circumstances, there is no appreciable enhancement in cycle life.

Accordingly, the methods of this invention require both an initial high level of water in the electrolyte and the use of an initial high rate discharge of the electrolytic cell. During cell cycling, the high level of water in the electrolyte is believed to react with the lithium at the anode to form lithium hydroxide and/or lithium oxide. It is therefore contemplated that the amount of water recited for the electrolyte can equivalently be added to the cathode or the anode can be pretreated prior to fabrication into the electrolytic cell with this requisite amount of water. Under either circumstance, it is contemplated that the electrolytic cell will behave equivalently to the electrolytic cells described herein when treated with the initial high rate discharge.

The following examples are offered to illustrate the present invention and should not be construed in any way as limiting its scope.

EXAMPLES

The following Example 1 illustrates a method of how an electrolytic cell could be fabricated.

EXAMPLE 1

A solid electrolytic cell is prepared by first preparing a cathodic paste which is spread onto a current collector and is then cured to provide for the cathode. An electrolyte solution is then placed onto the cathode surface and is cured to provide for the solid electrolyte composition. Then, the anode is laminated onto the solid electrolyte composition to provide for a solid electrolytic cell. The specifics of this construction are as follows:

A. The Current Collector

The current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween.

Specifically, the adhesion promoter layer is prepared as a dispersed colloidal solution in one of two methods. The first preparation of this colloidal solution for this example is as follows:

84.4 weight percent of carbon powder (Shawinigan Black TM—available from Chevron Chemical Company, San Ramon, Calif.)

337.6 weight percent of a 25 weight percent solution of polyacrylic acid (a reported average molecular weight of about 90,000, commercially available from Aldrich Chemical Company—contains about 84.4 grams polyacrylic acid and 253.2 grams water)

578.0 weight percent of isopropanol

The carbon powder and isopropanol are combined with mixing in a conventional high shear colloid mill mixer (Ebenbach-type colloid mill) until the carbon is uniformly dispersed and the carbon particle size is smaller than 10 microns. At this point, the 25 weight percent solution of polyacrylic acid is added to the solution and mixed for approximately 15 minutes. The resulting mixture is pumped to the coating head and roll coated with a Meyer rod onto a sheet of aluminum foil (about 9 inches wide and about 0.0005 inches thick). After application, the solution/foil are contacted with a Mylar wipe (about 0.002 inches thick by about 2 inches and by about 9 inches wide—the entire width of aluminum foil). The wipe is flexibly engaged with the foil (i.e., the wipe merely contacted the foil) to redistribute the solution so as to pro-vide for a substantially uniform coating. Evaporation of the solvents (i.e., water and isopropanol) via a conventional gas-fired oven provides for an electrically-conducting adhesion-promoter layer of about 6 microns in thickness or about $3 \times 10^{-4}$ grams per $cm^2$. The aluminum foil is then cut to about 8 inches wide by removing approximately ½ inch from either side by the use of a conventional slitter so as to remove any uneven edges.

In order to further remove the protic solvent from this layer, the foil is redried. In particular, the foil is wound up and a copper support placed through the roll's cavity. The roll is then hung overnight from the support in a vacuum oven maintained at about 130° C. Afterwards, the roll is removed. In order to avoid absorption of moisture from the atmosphere, the roll is preferably stored into a desiccator or other similar anhydrous environment to minimize atmospheric moisture content until the cathode paste is ready for application onto this roll.

The second preparation of this colloidal solution comprises mixing 25 lbs of carbon powder (Shawinigan Black ™—available from Chevron Chemical Company, San Ramon, Calif.) with 100 lbs of a 25 weight percent solution of polyacrylic acid (average molecular weight of about 240,000, commercially available from BF Goodrich, Cleveland, Ohio, as Good-Rite K702—contains about 25 lbs polyacrylic acid and 75 lbs water) and with 18.5 lbs of isopropanol. Stirring is done in a 30 gallon polyethylene drum with a gear-motor mixer (e.g., Lightin Labmaster Mixer, model XJ-43, available from Cole-Parmer Instruments Co., Niles, Ill.) at 720 rpm with two 5 inch diameter A310-type propellers mounted on a single shaft. This wets down the carbon and eliminates any further dust problem. The resulting weight of the mixture is 143.5 lbs and contains some "lumps".

The mixture is then further mixed with an ink mill which consists of three steel rollers almost in contact with each other, turning at 275, 300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 $\mu$m with the occasional 12.5 $\mu$m particles. The mixture can be stored for well over 1 month without the carbon settling out or reagglomerating.

When this composition is to be used to coat the current collector, an additional 55.5 lbs of isopropanol is mixed into the composition working with 5 gallon batches in a plastic pail using an air powered shaft mixer (Dayton model 42231 available from Granger Supply Co., San Jose, Calif.) with a 4 inch diameter Jiffy-Mixer brand impeller (such as an impeller available as Catalog No. G-04541-20 from Cole Parmer Instrument Co., Niles, Ill.). Then, it is gear pumped through a 25 $\mu$m cloth filter (e.g., So-Clean Filter Systems, American Felt and Filter Company, Newburgh, N.Y.) and Meyer-rod coated as described above.

B. The Cathode

The cathode is prepared from a cathodic paste which, in turn, is prepared from a cathode powder as follows:

i. Cathode Powder

The cathode powder is prepared by combining 90.44 weight percent $V_6O_{13}$ [prepared by heating ammonium metavanadate ($NH_4^+VO_3^-$) at 450° C. for 16 hours under $N_2$ flow] and 9.56 weight percent of carbon (from Chevron Chemical Company, San Ramon, Calif. under the tradename of Shawinigan Black ™). About 100 grams of the resulting mixture is placed into a grinding machine (Attritor Model S-1 purchased from Union Process, Akron, Ohio) and ground for 30 minutes. Afterwards, the resulting mixture is dried at about 260° C. for 21 hours.

ii. Cathode Paste

A cathode paste is prepared by combining sufficient cathode powder to provide for a final product having 45 weight percent $V_6O_{13}$.

Specifically, 171.6 grams of a 4:1 weight ratio of propylene carbonate:triglyme is combined with 42.9 grams of polyethylene glycol diacrylate (molecular weight about 400 available as SR-344 from Sartomer Company, Inc., Exton, Pa.), and about 7.6 grams of ethoxylated trimethylolpropane triacylate (TMPEOTA) (molecular weight about 450 available as SR-454 from Sartomer Company, Inc., Exton, Pa.) in a double planetary mixer (Ross #2 mixer available from Charles Ross & Sons, Company, Hauppag, N.Y.).

A propeller mixture is inserted into the double planetary mixer and the resulting mixture is stirred at a 150 rpms until homogeneous. The resulting solution is then passed through sodiated 4A molecular sieves. The solution is then returned to double planetary mixer equipped with the propeller mixer and about 5 grams of polyethylene oxide (number average molecular weight about 600,000 available as Polyox WSR-205 from Union Carbide Chemicals and Plastics, Danbury, Conn.) is added to the solution vortex from by the propeller by a mini-sieve such as a 25 mesh mini-sieve commercially available as Order No. 57333-965 from VWR Scientific, San Francisco, Calif.

The solution is then heated while stirring until the temperature of the solution reaches 65° C. At this point, stirring is continued until the solution is completely clear. The propeller blade is removed and the carbon powder prepared as above is then is added as well as an additional 28.71 grams of unground carbon (from Chevron Chemical Company, San Ramon, Calif. under the tradename of Shawinigan Black ™). The resulting mixture is mixed at a rate of 7.5 cycles per second for 30 minutes in the double planetary mixer. During this mixing the temperature is slowly increased to a maximum of 73° C. At this point, the mixing is reduced to 1 cycle per second the mixture slowly cooled to 40° C. to 48° C. (e.g. about 45° C.). The resulting cathode paste is maintained at this temperature until just prior to application onto the current collector.

The resulting cathode paste has the following approximate weight percent of components:

| | |
|---|---|
| $V_6O_{13}$ | 45 weight percent |
| Carbon | 10 weight percent |
| 4:1 propylene carbonate/triglyme | 34 weight percent |
| polyethylene oxide | 1 weight percent |
| polyethylene glycol diacrylate | 8.5 weight percent |
| ethoxylated trimethylolpropane triacrylate | 1.5 weight percent |

In an alternative embodiment, the requisite amounts of all of the solid components are added to directly to combined liquid components. In this regard, mixing speeds can be adjusted to account for the amount of the material mixed and size of vessel used to prepare the cathode paste. Such adjustments are well known to the skilled artisan.

In order to enhance the coatability of the carbon paste onto the current collector, it may be desirable to heat the paste to a temperature of from about 60° C. to about 130° C. and more preferably, from about 80° C. to about 90° C. and for a period of time of from about 0.1 to about 2 hours, more preferably, from about 0.1 to 1 hour and even more preferably from about 0.2 to 1 hour. A particularly preferred combination is to heat the paste at from about 80° C. to about 90° C. for about 0.33 to about 0.5 hours.

During this heating step, there is no need to stir or mix the paste although such stirring or mixing may be conducted during this step. However, the only requirement is that the composition be heated during this period. In this regard, the composition to be heated has a volume to surface area ratio such that the entire mass is heated during the heating step.

A further description of this heating step is set forth in U.S. patent application Ser. No. 07/968,203 filed Oct. 29, 1992 as Attorney Docket No. 1116 and entitled "METHODS FOR ENHANCING THE COATABILITY OF CARBON PASTES TO SUBSTRATES", which application is incorporated herein by reference in its entirety.

The so-prepared cathode paste is then placed onto the adhesion layer of the current collector described above by extrusion at a temperature of from about 45° to about 48° C. A Mylar cover sheet is then placed over the paste and the paste is spread to thickness of about 90 microns ($\mu$m) with a conventional plate and roller system and is cured by continuously passing the sheet through an electron beam apparatus (Electrocurtain, Energy Science Inc., Woburn, Mass.) at a voltage of about 175 kV and a current of about 1.0 mA and at a rate of about 1 cm/sec. After curing, the Mylar sheet is removed to provide for a solid cathode laminated to the aluminum current collector described above.

C. Electrolyte 56.51 grams of propylene carbonate, 14.13 grams of triglyme, and 17.56 grams of urethane acrylate (Photomer 6140, available from Henkel Corp., Coating and Chemical Division, Ambler, Pa.) are combined at room temperature until homogeneous. The resulting solution is passed through a column of 4A sodiated molecular sieves to remove water and then mixed at room temperature until homogeneous.

At this point, 2.57 grams of polyethylene oxide film forming agent having a number average molecular weight of about 600,000 (available as Polyox WSR-205 from Union Carbide Chemicals and Plastics, Danbury, Conn.) is added to the solution and then dispersed while stirring with a magnetic stirrer over a period of about 120 minutes. After dispersion, the solution is heated to between 60° C. and 65° C. with stirring until the film forming agent dissolved. The solution is cooled to a temperature of between 45° and 48° C., a thermocouple is placed at the edge of the vortex created by the magnetic stirrer to monitor solution temperature, and then 9.24 grams of $LiPF_6$ is added to the solution over a 120 minute period while thoroughly mixing to ensure a substantially uniform temperature profile throughout the solution. Cooling is applied as necessary to maintain the temperature of the solution between 45° and 48° C.

In one embodiment, the polyethylene oxide film forming agent is added to the solution via a mini-sieve such as a 25 mesh mini-sieve commercially available as Order No. 57333-965 from VWR Scientific, San Francisco, Calif.

The resulting solution contains the following:

| Component | Amount | Weight Percent[a] |
|---|---|---|
| Propylene Carbonate | 56.51 g | 56.51 |
| Triglyme | 14.13 g | 14.13 |
| Urethane Acrylate | 17.56 g | 17.56 |
| $LiPF_6$ | 9.24 g | 9.24 |
| PEO Film Forming Agent | 2.57 g | 2.57 |
| Total | 100 g | 100 |

[a] = weight percent based on the total weight of the electrolyte solution (100 g)

This solution is then degassed to provide for an electrolyte solution wherein little, if any, of the $LiPF_6$ salt decomposes.

Optionally, solutions produced as above and which contains the prepolymer, the polyalkylene oxide film forming agent, the electrolytic solvent and the $LiPF_6$ salt are filtered to remove any solid particles or gels remaining in the solution. One suitable filter device is a sintered stainless steel screen having a pore size between 1 and 50 $\mu$m at 100% efficiency.

Alternatively, the electrolyte solution can be prepared in the following manner. Specifically, in this example, the mixing procedure is conducted using the following weight percent of components:

| | |
|---|---|
| Propylene Carbonate | 52.472 weight percent |
| Triglyme | 13.099 weight percent |
| Urethane Acrylate[b] | 20.379 weight percent |
| $LiPF_6$ | 10.720 weight percent |
| PEO Film Forming Agent[c] | 3.340 weight percent |

[b](Photomer 6140, available from Henkel Corp., Coating and Chemical Division, Ambler, PA)
[c]polyethylene oxide film forming agent having a number average molecular weight of about 600,000 (available as Polyox WSR-205 from Union Carbide Chemicals and Plastics, Danbury, CT)

The mixing procedure employs the following steps:
1. Check the moisture level of the urethane acrylate. If the moisture level is less than 100 ppm water, proceed to step 2. If not, then first dissolve the urethane acrylate at room temperature, <30° C., in the propylene carbonate and triglyme and dry the solution over sodiated 4A molecular sieves (Grade 514, 8-12 Mesh from Schoofs Inc., Moraga, Calif.) and then proceed to step 4.
2. Dry the propylene carbonate and triglyme over sodiated 4A molecular sieves (Grade 514, 8-12 Mesh from Schoofs Inc., Moraga, Calif.).
3. At room temperature, <30° C., add the urethane acrylate to the solvent prepared in step 2. Stir at 300 rpm until the resin is completely dissolved. The solution should be clear and colorless.
4. Dry and then sift the polyethylene oxide film forming agent through a 25 mesh mini-sieve commercially available as Order No. 57333-965 from VWR Scientific, San Francisco, Calif. While stirring at 300 rpm, add the dried and pre-sifted polyethylene oxide film forming agent slowing to the solution. The polyethylene oxide film forming agent should be sifted into the center of the vortex formed by the stirring means over a 30 minute period. Addition of the polyethylene oxide film forming agent should be dispersive and, during addition, the temperature should be maintained at room temperature (<30° C.).
5. After final addition of the polyethylene oxide film forming agent, stir an additional 30 minutes to ensure that the film forming agent is substantially dispersed.

6. Heat the mixture to 68° C. to 75° C. and stir until the film forming agent has melted and the solution has become transparent to light yellow in color. Optionally, in this step, the mixture is heated to 65° C. to 68° C.
7. Cool the solution produced in step 6 and when the temperature of the solution reaches 40° C., add the LiPF$_6$ salt very slowly making sure that the maximum temperature does not exceed 55° C.
8. After the final addition of the LiPF$_6$ salt, stir for an additional 30 minutes, degas, and let sit overnight and cool.
9. Filter the solution through a sintered stainless steel screen having a pore size between 1 and 50 μm at 100% efficiency.

At all times, the temperature of the solution should be monitored with a thermocouple which should be placed in the vortex formed by the mixer.

Afterwards, the electrolyte mixture is then coated by a conventional knife blade to a thickness of about 50 μm onto the surface of the cathode sheet prepared as above (on the side opposite that of the current collector) but without the Mylar covering. The electrolyte is then cured by continuously passing the sheet through an electron beam apparatus (Electrocurtain, Energy Science Inc., Woburn, Mass.) at a voltage of about 175 kV and a current of about 1.0 mA and at a conveyor speed setting of 50 which provides for a conveyor speed of about 1 cm/sec. After curing, a composite is recovered which contained a solid electrolyte laminated to a solid cathode.

D. Anode

The anode comprises a sheet of lithium foil (about 76 μm thick) which is commercially available from FMC Corporation Lithium Division, Bessemer City, N.C.

E. The Solid Electrolytic Cell

A sheet comprising a solid battery is prepared by laminating the lithium foil anode to the surface of the electrolyte in the sheet produced in step C above. Lamination is accomplished by minimal pressure.

EXAMPLE 2

Four electrolytic cells were prepared in a manner similar to that described above except that:
1. each of these electrolytic cells employed the second preparation for the colloidal adhesive solution which is applied onto the current collector; and
2. each of these electrolytic cells employed the first procedure for preparing the electrolyte solution which contains the following weight percent components:

| Component | Weight Percent |
| --- | --- |
| Propylene Carbonate | 56.51 |
| Triglyme | 14.13 |
| urethane acrylate | 17.56 |
| LiPF$_6$ | 9.24 |
| PEO film forming agent | 2.57 | wherein the urethane acrylate and the polyethylene oxide are the same as those recited in Example 1 and further wherein the electrolyte is formulated to contain about 3000 ppm water. This level of water was achieved by adding 0.3 weight percent water to the electrolyte solution described above and then mixing this solution until homogeneous.

The four electrolytic cells were fabricated in a charged state and had an initial potential of about 3.6 volts. The four cells were divided into two groups of two cells each. After fabrication, the first group of cells (cells A and B) were discharged at a high rate discharge of about 1 milliamp per cm$^2$ and discharging was continued at this rate until the cell potential reached 1.8 volts. The cells were then charged at a rate of 0.25 milliamp per cm$^2$ and charging was continued until the cell potential reached about 3 volts.

Cells A and B were cycled in the manner described above during each of the separate cycles.

The second group of cells (cells C and D) were placed on the same discharge/charge cycles with the exception that, after charging in the second, tenth and twentieth discharge/charge cycles, these cells were discharged using a spiked discharge. That is to say that discharging in the third, eleventh, and twenty-first cycles, was conducted not at the high rate discharge recited above for electrolytic cells A and B, but at a spiked discharge which comprised the following twelve step process:
1. discharge at a rate of 4 milliamp per cm$^2$ until the cell potential is reduced to 1.8 volts
2. 15 minute rest
3. discharge at a rate of 2 milliamp per cm$^2$ until the cell potential is reduced to 1.8 volts
4. 15 minute rest
5. discharge at a rate of 1 milliamp per cm$^2$ until the cell potential is reduced to 1.8 volts
6. 15 minute rest
7. discharge at a rate of 0.5 milliamp per cm$^2$ until the cell potential is reduced to 1.8 volts
8. 15 minute rest
9. discharge at a rate of 0.25 milliamp per cm$^2$ until the cell potential is reduced to 1.8 volts
10. 15 minute rest
11. discharge at a rate of 0.125 milliamp per cm$^2$ until the cell potential is reduced to 1.8 volts
12. 15 minute rest During this spike discharge, the capacity exhausted by electrolytic cell D is as follows:

| Step | Capacity[1] | Total Capacity[1] |
| --- | --- | --- |
| 1 | 23.73 | 23.73 |
| 3 | 26.30 | 50.03 |
| 5 | 5.72 | 55.75 |
| 7 | 2.52 | 58.27 |
| 9 | 1.79 | 60.06 |
| 11 | 1.42 | 61.48 |

[1]— in milliamphour

The total capacity of 61.48 milliamphours exhausted by electrolytic cell D during this spiked discharge represents greater than 90% of charged cell D's capacity prior to discharge via the spiked discharge procedure recited above.

Electrolytic cell C was similarly discharged and the total capacity exhausted by cell C during this spiked discharge also was greater than 90% of charged cell's C capacity prior to discharge via the spiked discharge procedure.

The results of extended cycling of cells A, B, C and D, are set forth in FIG. 1. In FIG. 1, cell D failed at cycle number 69 and no longer was able to accept a charge. Likewise, cell C failed at cycle number 131. Contrarily, cell A failed at cycle number 207 and cell B has not yet failed at cycle number 228. Accordingly, these results demonstrate that the initial high rate discharge for electrolytic cells A and B provides for significant enhancement of the cycle life of solid, secondary electrolytic cells comprising electrodes having at least about 100 ppm water as compared to the spiked discharge.

EXAMPLE 3

Five electrolytic cells were prepared in a manner similar to that described above except that:
1. each of these electrolytic cells employed the second preparation for the colloidal adhesive solution which is applied onto the current collector; and
2. each of these electrolytic cells employed the first procedure for preparing the electrolyte solution and contained the following weight percent components:

| Component | Weight Percent |
|---|---|
| Propylene Carbonate | 55.04 |
| Triglyme | 13.76 |
| urethane acrylate | 17.1 |
| LiAsF$_6$ | 11.6 |
| PEO film forming agent | 2.5 |
| Total | 100 |

Additionally, to this solution was then added 0.5 weight percent of Triton X (surfactant) based on the total weight of the solution.

The urethane acrylate and the PEO (polyethylene oxide) are the same as those recited in Example 1 and further wherein the electrolyte is formulated to contain less than 100 ppm water by carefully controlling the amount of water incorporated into the electrolyte solution.

The five electrolytic cells were fabricated in a charged state and had an initial potential of about 3.6 volts. The five cells were divided into two groups. After fabrication, the first group of cells (cells A, B and C) were discharged at a high rate discharge of about 1 milliamp per cm$^2$ and discharging was continued at this rate until the cell potential reached 1.8 volts. The cells were then charged at a rate of 0.25 milliamp per cm$^2$ and charging was continued until the cell potential reached about 3 volts.

Cells A, B and C were cycled in the manner described above during each of the separate cycles.

The second group of cells (cells D and E) were placed on the same discharge/charge cycles with the exception that, after charging in the second, tenth and twentieth discharge/charge cycles, these cells were discharged using a spiked discharge. That is to say that discharging in the third, eleventh, and twenty-first cycles, was conducted not at the high rate discharge recited above for electrolytic cells A, B and C, but at a spiked discharge which comprised the following twelve step process:
1. discharge at a rate of 4 milliamp per cm$^2$ until the cell potential is reduced to 1.8 volts
2. 15 minute rest
3. discharge at a rate of 2 milliamp per cm$^2$ until the cell potential is reduced to 1.8 volts
4. 15 minute rest
5. discharge at a rate of 1 milliamp per cm$^2$ until the cell potential is reduced to 1.8 volts
6. 15 minute rest
7. discharge at a rate of 0.5 milliamp per cm$^2$ until the cell potential is reduced to 1.8 volts
8. 15 minute rest
9. discharge at a rate of 0.25 milliamp per cm$^2$ until the cell potential is reduced to 1.8 volts
10. 15 minute rest
11. discharge at a rate of 0.125 milliamp per cm$^2$ until the cell potential is reduced to 1.8 volts
12. 15 minute rest During this spike discharge, the capacity exhausted by electrolytic cell E is as follows:

| Step | Capacity[1] | Total Capacity[1] |
|---|---|---|
| 1 | 14.70 | 14.70 |
| 3 | 27.10 | 41.80 |
| 5 | 5.70 | 47.50 |
| 7 | 2.35 | 49.85 |
| 9 | 1.62 | 51.47 |
| 11 | 1.42 | 52.89 |

[1] — in milliamphour

The total capacity of 52.89 milliamphours exhausted by electrolytic cell E during this spiked discharge represents greater than 90% of charged cell E's capacity prior to discharge via the spiked discharge procedure recited above.

Electrolytic cell D was similarly discharged and the total capacity exhausted by cell D during this spiked discharge also was greater than of charged cell's D capacity prior to discharge via the spiked discharge procedure.

The results of extended cycling of cells A, B, C, D and E, are set forth in FIG. 2. In FIG. 2, cell A shorted out within the first 10 cycles and was thereafter not included within this test. Cells B and C failed to maintain a capacity of at least 0.03 amp hours at cycle 97 and 106 respectively whereas cells D and E continue to maintain a capacity of greater than 0.04 amp hours at cycles 123 and 130 respectively and were still cycling. However, while not shown in FIG. 2, cell D failed to maintain a capacity of 0.03 amp hours at cycle 176 and cell E at cycle 158.

Accordingly, these results demonstrate that the spiked discharge for electrolytic cells D and E provides for significant enhancement of the cycle life of solid, secondary electrolytic cells comprising electrodes having less than about 100 ppm water as compared to the spiked discharge.

These results clearly indicate the criticality of the preconditioning step in conjunction with the amount of water used since, as noted in U.S. patent application Ser. No. 08/049,201, (filed concurrently herewith as Attorney Docket No. 1267 and entitled "METHODS FOR EXTENDING THE CYCLE LIFE OF SOLID, SECONDARY ELECTROLYTIC CELLS USING A SPIKED DISCHARGE" and incorporated herein by reference in its entirety), an initial spiked discharge such as that described above is effective in enhancing the cycle life of solid, secondary electrolytic cells having an electrolyte comprising less than about 100 ppm water.

What is claimed is:

1. A method for extending the cycle life of a charged electrolytic cell comprising a lithium anode, a cathode comprising recyclable cathodic material which provides for an electrolytic cell potential after fabrication of at least 2.0 volts when used in combination with the lithium anode, and a solid, signal-phase, solvent-containing electrolyte which comprises a solid polymeric matrix, an alkali salt, an electrolytic solvent, and from about 500 to about 10,000 ppm water, wherein the electrolyte is interposed between the anode and the cathode, which method comprises:
- (a) a discharge of the charged electrolytic cell at a substantially constant rate of at least 0.5 milliamp per $cm^2$;
- (b) maintaining said discharge rate until the potential of the electrolytic cell is reduced by at least 0.5 volts compared to the potential prior to discharge with the proviso that the potential is not reduced to less than 1 volt and wherein the substantially constant discharge rate has a variability of no more than about ±5 percent.

2. The method according to claim 1 wherein the substantially constant discharge rate has a variability of no more than about ±2 percent.

3. The method according to claim 1 wherein the substantially constant discharge rate is at least about 0.75 milliamp per $cm^2$.

4. The method according to claim 3 wherein the substantially constant discharge rate is at least about 1 milliamp per $cm^2$.

5. An electrolytic cell comprising:
a lithium anode,
a cathode comprising recyclable cathodic material which provides for an electrolytic cell potential after fabrication of at least 2 volts when used in combination with the lithium anode, and
a solid, single-phase, solvent-containing electrolyte which comprises a solid polymeric matrix, an alkali salt, an electrolytic solvent, and from about 500 to about 10,000 ppm water,
wherein the electrolyte is interposed between the anode and the cathode and further wherein, after fabrication, the charged electrolytic cell is subjected to a discharge at a substantially constant rate of at least 0.5 milliamp per $cm^2$ wherein said discharge is maintained until the potential of the electrolytic cell is reduced by at least 0.5 volts compared to the potential prior to discharge with the proviso that the potential of the electrolytic cell is not reduced to less than 1 volt
and further wherein the substantially constant discharge rate has a variability of no more than about ±5 percent.

6. The electrolytic cell according to claim 5 wherein the substantially constant discharge rate has a variability of no more than about ±2 percent.

7. The electrolytic cell according to claim 5 wherein the substantially constant discharge rate is at least about 0.75 milliamp per $cm^2$.

8. The electrolytic cell according to claim 7 wherein the substantially constant discharge rate is at least about 1 milliamp per $cm^2$.

9. An electrolytic cell comprising:
a lithium anode,
cathode comprising $V_6O_{13}$ which provides for an electrolytic cell potential after fabrication of about 3.6 volts when used in combination with the lithium anode, and
a solid, single-phase, solvent-containing electrolyte which comprises a solid polymeric matrix, an alkali salt, an electrolytic solvent, and from about 500 to about 10,000 ppm water, wherein the electrolyte is interposed between the anode and the cathode and further wherein, after fabrication, the charged electrolytic cell is subjected to a discharge at a substantially constant rate of at least 0.5 milliamp per $cm^2$ wherein said discharge is maintained until the potential of the electrolytic cell is reduced to about 1.8 volts and further wherein the substantially constant discharge rate has a variability of no more than about ±5 percent.

* * * * *